US010520102B2

(12) United States Patent
Benetti et al.

(10) Patent No.: US 10,520,102 B2
(45) Date of Patent: Dec. 31, 2019

(54) GAS SAFETY VALVE SENSITIVE TO TEMPERATURE AND METHOD FOR THE CONSTRUCTION OF SUCH A SAFETY VALVE

(71) Applicant: PIETRO FIORENTINI SPA, Arcugnano (VI) (IT)

(72) Inventors: Marco Benetti, Montecchio Maggiore (IT); Massimo Dal Pozzo, San Vito Di Leguzzano (IT)

(73) Assignee: Pietro Fiorentini SPA, Arcugnano (VI) (IT)

( * ) Notice: Subject to any disclaimer, the term of this patent is extended or adjusted under 35 U.S.C. 154(b) by 2 days.

(21) Appl. No.: 15/769,683

(22) PCT Filed: Nov. 9, 2016

(86) PCT No.: PCT/IB2016/056749
§ 371 (c)(1),
(2) Date: Apr. 19, 2018

(87) PCT Pub. No.: WO2017/081627
PCT Pub. Date: May 18, 2017

(65) Prior Publication Data
US 2018/0306338 A1     Oct. 25, 2018

(30) Foreign Application Priority Data
Nov. 9, 2015 (IT) .................. 102015000070266

(51) Int. Cl.
*F16K 17/00* (2006.01)
*F16K 17/38* (2006.01)
*F16K 31/56* (2006.01)
*F16K 17/04* (2006.01)
*F16K 31/00* (2006.01)

(52) U.S. Cl.
CPC ........ *F16K 17/003* (2013.01); *F16K 17/0486* (2013.01); *F16K 17/38* (2013.01);
(Continued)

(58) Field of Classification Search
CPC .... F16K 17/003; F16K 17/0486; F16K 17/38; F16K 31/56; F16K 31/566; F16K 31/44;
(Continued)

(56) References Cited

U.S. PATENT DOCUMENTS 1,299,850 A * 4/1919 MacDonald ............ F16K 31/56
251/73
1,314,244 A * 8/1919 Brand ..................... F16K 31/56
251/243
(Continued)

FOREIGN PATENT DOCUMENTS

DE      21 56 068        11/1971
DE      37 00 822 C1     10/1987
(Continued)

OTHER PUBLICATIONS

International Search Report and Written Opinion dated Jan. 27, 2017, issued in PCT Application No. PCT/IB2016/056749, filed Nov. 9, 2016.

*Primary Examiner* — Reinaldo Sanchez-Medina
*Assistant Examiner* — David Colon-Morales
(74) *Attorney, Agent, or Firm* — Workman Nydegger

(57) ABSTRACT

Gas safety valve includes: a valve body which defines a flow pipe and in which a shutter is located, movable between an open position and a closed position to, respectively, allow and prevent the flow of an operating gas through the flow pipe; first thrusting apparatus for the shutter in the closed position; a retaining mechanism to maintain the shutter in the open position, the release of which can be forced by a release so as to release the shutter; a control element movable between a locking position and a released position to, respectively, prevent and allow the release of the retaining mechanism; a first actuator device to force the control element into the released position. The first actuator device includes an actuator body movable between a rest position
(Continued)

to allow the control element to maintain the locking position and a working position to force the control element into its released position, a retaining spring to force the actuator body into a rest position and a shape memory spring to overcome the force of the retaining spring and force the actuator body into the working position when the temperature of the shape memory spring is within a predetermined temperature range.

11 Claims, 5 Drawing Sheets

(52) U.S. Cl.
CPC .......... *F16K 31/002* (2013.01); *F16K 31/566* (2013.01); *Y10T 137/1963* (2015.04)

(58) Field of Classification Search
CPC .. F16K 31/002; F03G 7/065; Y10T 137/1963; Y10T 137/1915
See application file for complete search history.

(56) References Cited

U.S. PATENT DOCUMENTS

| | | | |
|---|---|---|---|
| 2,070,661 A * | 2/1937 | Hughes | F16K 31/56 137/463 |
| 2,324,552 A | 7/1943 | Bailey | |
| 2,765,803 A * | 10/1956 | Dykzeul | F16K 17/38 137/79 |
| 3,294,114 A | 12/1966 | Birkemeier | |
| 3,381,993 A * | 5/1968 | Arlauskas | E05B 77/48 292/210 |
| 3,384,101 A * | 5/1968 | Melzer | F16K 17/003 137/314 |
| 3,800,816 A * | 4/1974 | Follett | F16K 17/38 137/75 |
| 3,801,064 A * | 4/1974 | Harris | F16K 17/38 251/73 |
| 7,219,687 B2 * | 5/2007 | Vasquez | F03G 7/065 137/457 |
| 2005/0217723 A1* | 10/2005 | Linden | F16K 17/38 137/39 |
| 2016/0169399 A1* | 6/2016 | Andueza | F16K 31/084 137/78.4 |

FOREIGN PATENT DOCUMENTS

| | | |
|---|---|---|
| EP | 0 846 901 A2 | 6/1998 |
| GB | 2 355 509 A | 4/2001 |
| WO | 1990/06462 | 6/1990 |
| WO | 2009/124766 A2 | 10/2009 |

* cited by examiner

GAS SAFETY VALVE SENSITIVE TO TEMPERATURE AND METHOD FOR THE CONSTRUCTION OF SUCH A SAFETY VALVE

BACKGROUND OF THE INVENTION

1. The Field of the Invention

The present invention relates to a modular, temperature control safety valve particularly suitable to be used in natural gas or other combustible gas distribution networks for the supply of domestic and/or industrial users.

2. The Relevant Technology

Safety valves able to interrupt the flow of gas along a pipe in the presence of an excessive variation of gas pressure with respect to a predefined setting value or in the presence of ambient temperature values outside a predefined range are known to the prior art.

Valves of the aforementioned type are described in patents DE 2156068 and U.S. Pat. No. 2,324,552.

A pressure-sensitive safety valve of the known type comprises a movable shutter which, due to the thrust provided by a spring, closes the piping in which the gas flows. The valve also comprises a retaining mechanism able to maintain the shutter open.

The retaining mechanism is configured to be forced into its release position by the thrust of the shutter, but it is maintained in its retaining position by a control unit which prevents the release as long as the gas pressure present in the pipe remains near the predefined setting value.

The control unit includes a control chamber partially delimited by a deformable membrane and a kinematic mechanism that connects the membrane to the retaining mechanism.

The membrane is subject to the gas pressure present in the pipe and to the thrust action of a spring which counteracts the aforementioned pressure.

When the gas pressure deviates from the predefined setting value, the movement of the membrane, transmitted by the kinematic mechanism, causes the release of the retaining mechanism and consequently frees the shutter, which moves into its closed position thus interrupting the gas flow.

Where a distribution network needs to be protected from temperature anomalies, in addition to the safety valve described above it is also necessary to install an additional temperature-sensitive safety valve, with the consequent additional costs for the installation and maintenance of the second valve.

Alternatively to the above solution, the document DE 3700822 shows a safety valve sensitive to both pressure and temperature.

The present invention intends to overcome the above drawback of gas pressure-sensitive safety valves of the known type.

In particular, the object of the present invention is to obtain a temperature-sensitive safety valve by modifying a pressure-sensitive safety valve of the known type described above without altering the main parts, namely the valve body, the shutter and the retaining mechanism.

SUMMARY OF THE INVENTION

The above object is achieved by a gas safety valve in accordance with claim 1.

The aforementioned object is also achieved by a method for constructing the aforementioned gas safety valve, in accordance with claim 15.

Further detailed characteristics of the invention are provided in their respective dependent claims.

The safety valve of the invention is modular and, therefore, can be configured in a pressure-sensitive version, in a temperature-sensitive version, or in a version sensitive to both pressure and temperature.

Advantageously, the aforementioned modularity reduces manufacturing and management costs of the above mentioned versions by the manufacturer, since all versions utilize a single basic valve unit comprising the valve body, the shutter, the retaining mechanism and a part of the control unit, changing just the part of the control unit sensitive to temperature and/or pressure.

Another advantage is the ability to manufacture a single safety valve sensitive to variations of both temperature and pressure limiting the costs of installation and maintenance of the valves.

A further advantage is that the invention allows an already installed valve to be easily modified to one of the aforementioned three versions so as to convert it to another version, with no need to uninstall the valve from the network and, therefore, avoiding the relative labour costs and those related to the suspension of the gas distribution service.

BRIEF DESCRIPTION OF THE DRAWINGS

The aforementioned object and advantages, together with others which will be better described later, will be highlighted in the following description of a preferred embodiment of the invention, which is given only by way of non-limiting example with reference to the enclosed drawings, wherein.

DETAILED DESCRIPTION OF THE PREFERRED EMBODIMENTS

Figure 1:
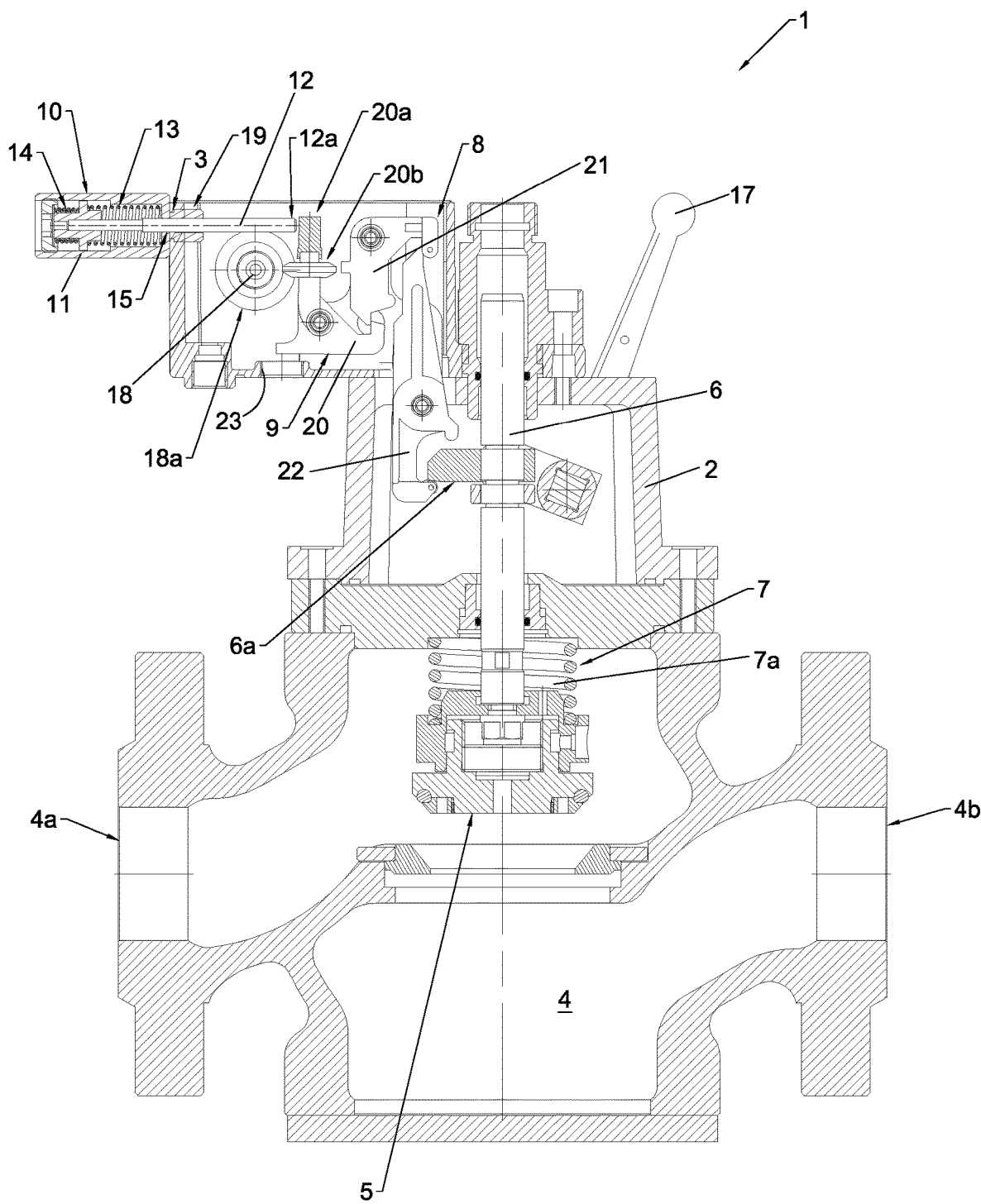
FIG. 1 shows the sectional view of the safety valve of the invention.

The gas safety valve of the invention, indicated as a whole by number 1 in FIG. 1, comprises a valve body 2 comprising an inlet 4a and an outlet 4b that are placed in communication with each other by a flow pipe 4 through which the operating gas, for example natural gas, passes.

Figure 3:
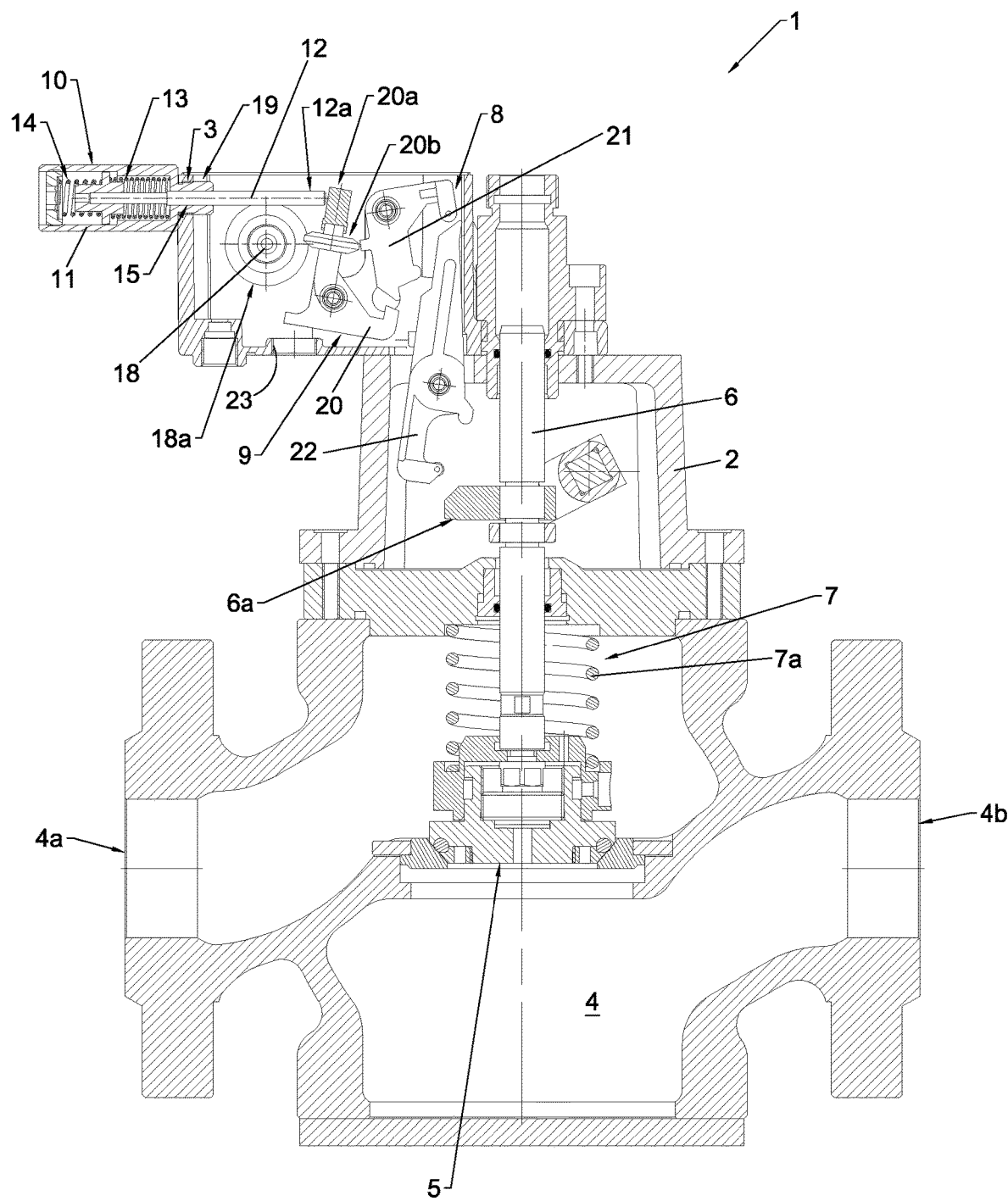
FIG. 3 shows the valve of FIG. 1 in a different operating configuration.

There is also a shutter 5 located in the flow pipe 4 above which can be moved from an open position shown in FIG. 1, in which the shutter 5 allows the operating gas to flow, and a closed position shown in FIG. 3, in which the shutter 5 closes the pipe 4 thus preventing the gas from flowing.

The shutter 5 is pushed into the closed position by first thrust means 7 which preferably comprise a spring 7a.

The valve 1 further comprises a removable retaining mechanism 8 mounted in the valve body 2.

The retaining mechanism 8 is suited to counteract the action of the first thrust means 7 to maintain the shutter 5 in the open position and is associated with release means that force it into the release position so as to free the shutter 5.

The release of the retaining mechanism 8 is controlled by a removable control element 9 mounted in the valve body 2, which is movable between a locking position and a released position in which it, respectively, prevents and allows the action of the release means.

There is also a first actuator device 10 to force the control element 9 into the released position when an event considered hazardous for the network is detected.

According to the invention, the aforementioned first actuator device 10 comprises an actuator body 12 equipped with an end 12*a* and movable between a rest position, in which it allows the control element 9 to maintain the locking position, and a working position, in which its end 12*a* forces the control element 9 into the released position.

The first actuator device 10 also comprises a retaining spring 13, configured to force the actuator body 12 into the rest position, and a shape memory spring 14.

The shape memory spring 14 is configured to overcome the force of the retaining spring 13 on the actuator body 12 so as to force the latter into the working position when the temperature of the shape memory spring 14 is within a predetermined range of temperature considered hazardous for the network, for example above a certain temperature threshold.

On the contrary, when the temperature is outside the above range, the shape memory spring 14 loses its mechanical characteristics, allowing the retaining spring 13 to bring the actuator body 12 back to the rest position.

It is understood that the above-described configuration allows the use of the same control unit as that of the shutter 5, comprising the retaining mechanism 8 and the control element 9, used in a pressure-sensitive safety valve of the known type, even for control in the presence of temperature anomalies, by simply adapting the valve body 2 to receive the first actuator device 10 described above.

In this way the object of the invention is achieved.

Advantageously, the possibility of adapting a pressure-sensitive safety valve so that it can also respond to temperature anomalies avoids the problem of having to install two separate safety valves, allowing the reduction of the costs involved in the installation and maintenance of the valves.

Preferably, the first actuator device 10 comprises a casing 11 which houses the actuator body 12, the retaining spring 13 and the shape memory spring 14.

The casing 11 is equipped with a hole 15 in which the actuator body 12 is slidably mounted so that its end 12*a* protrudes outside the casing 11.

The valve body 2 is equipped with a through hole 3 facing the control element 9.

In addition, there are connecting means 19 to removably connect the casing 11 to the valve body 2 in such a way that the end 12*a* of the actuator body 12 is arranged through the above through hole 3 and can, therefore, actuate the control element 9.

Advantageously, the aforementioned first actuator device 10 may be associated with an existing pressure-sensitive safety valve so as to make it sensitive to temperature, without the need to change other parts of the valve.

Consequently, a pressure-sensitive safety valve already installed in a network may be advantageously adapted without having to remove it from the network itself.

Preferably, the aforementioned connecting means 19 comprise an internal thread belonging to the through hole 3 of the valve body 2 and a corresponding external thread belonging to the casing 11.

Obviously other embodiments of the invention may envisage that the connection means 19 take the form of any other type of screw means belonging to the valve body 2 and the casing 11, even different than those described above.

Preferably but not necessarily, the through hole 3 is expressly provided for the connection of the first actuator device 10.

According to a variant embodiment of the invention, the first actuator device 10 can be connected to a hole 23 made in the valve body 2 to accommodate the test button of the safety valve 1.

This test button, normally included in all safety valves, enables an operator to manually force the control element 9 into the released position to verify the correct operation of the retaining mechanism 8.

The variant embodiment just described has the advantage of allowing the connection of the first actuator device 10 to the valve body 2 without the need to provide for an additional hole: in fact it will be sufficient to replace the test button already present in the valve 1 with the first actuator device 10.

As regards the control element 9, it preferably comprises a control lever 20 one end of which 20*c* constrains the retaining mechanism 8 preventing its release.

Preferably, the aforementioned end 20*c* is in the shape of a tooth able to become engaged with a corresponding contact surface of the retaining mechanism 8.

The end 12*a* of the actuator body 12 is facing the aforementioned control lever 20 so as to move it when the actuator body 12 is put in the working position so as to release the retaining mechanism 8.

Advantageously, the aforementioned control lever 20 can be coupled, not just to the first actuator device 10, but also to a second actuator device able to actuate the safety valve 1 in the case of gas pressure anomalies, which is not shown in the figures but is of a known type.

Preferably, the second actuator device comprises a control chamber partially delimited by a movable wall which, preferably, takes the form of an elastic membrane.

Preferably, the aforementioned control chamber is placed at the same pressure as the gas in the flow pipe 4, for example by putting it in communication with the flow pipe 4 through a connection pipe, so that the movable wall is subject to a pressure force proportional to the aforementioned pressure.

The second actuator device also comprises second thrust means which exert a counterforce on the movable wall against the aforementioned pressure force.

The aforementioned second thrust means are calibrated in such a way as to balance the force exerted by the pressure when the gas pressure is equal to a predefined setting value, in correspondence with which the movable wall assumes a predetermined reference position.

Preferably, the aforementioned second thrust means are adjustable in order to modify the setting value.

Still preferably, the aforementioned second thrust means comprise a spring.

The second actuator device also comprises transmission means which mechanically connect the movable wall to the retaining mechanism 8.

In particular, the aforementioned transmission means are configured in such a way that, when a variation of the gas pressure in the control chamber causes a sufficient displacement of the movable wall from the reference position, the retaining mechanism 8 is released so as to unlock the shutter 5.

Preferably, the aforementioned transmission means comprise a transmission shaft 18 associated with the movable wall and equipped with an end 18*a* able to be placed in contact with the control lever 20 in order to move it so as to release the retaining mechanism 8.

In particular, the end 18*a* engages a cam 20*b* belonging to the end 20*a* of the control lever 20.

Figure 2:
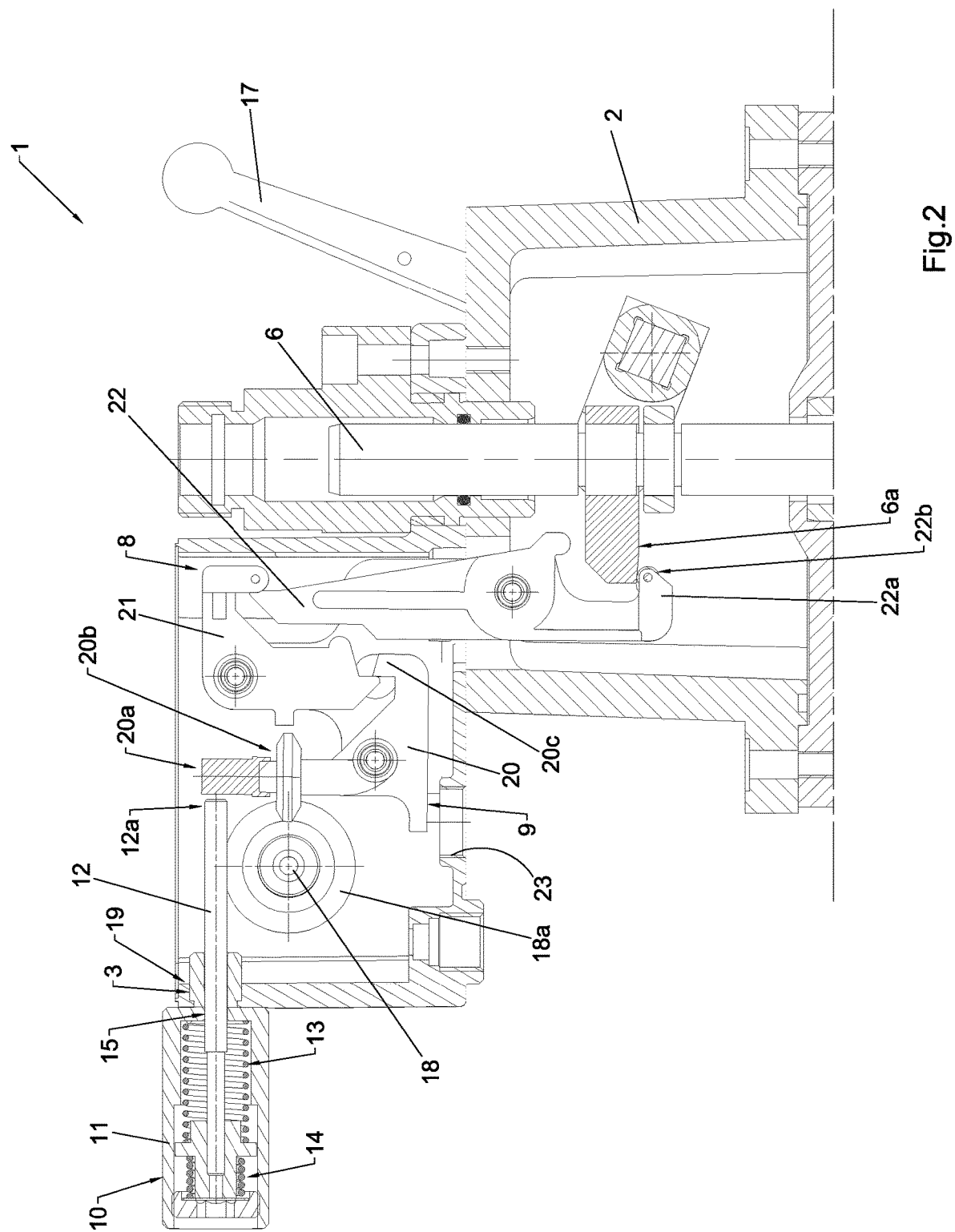
FIG. 2 shows an enlarged detail of FIG. 1 above.
Figure 4:
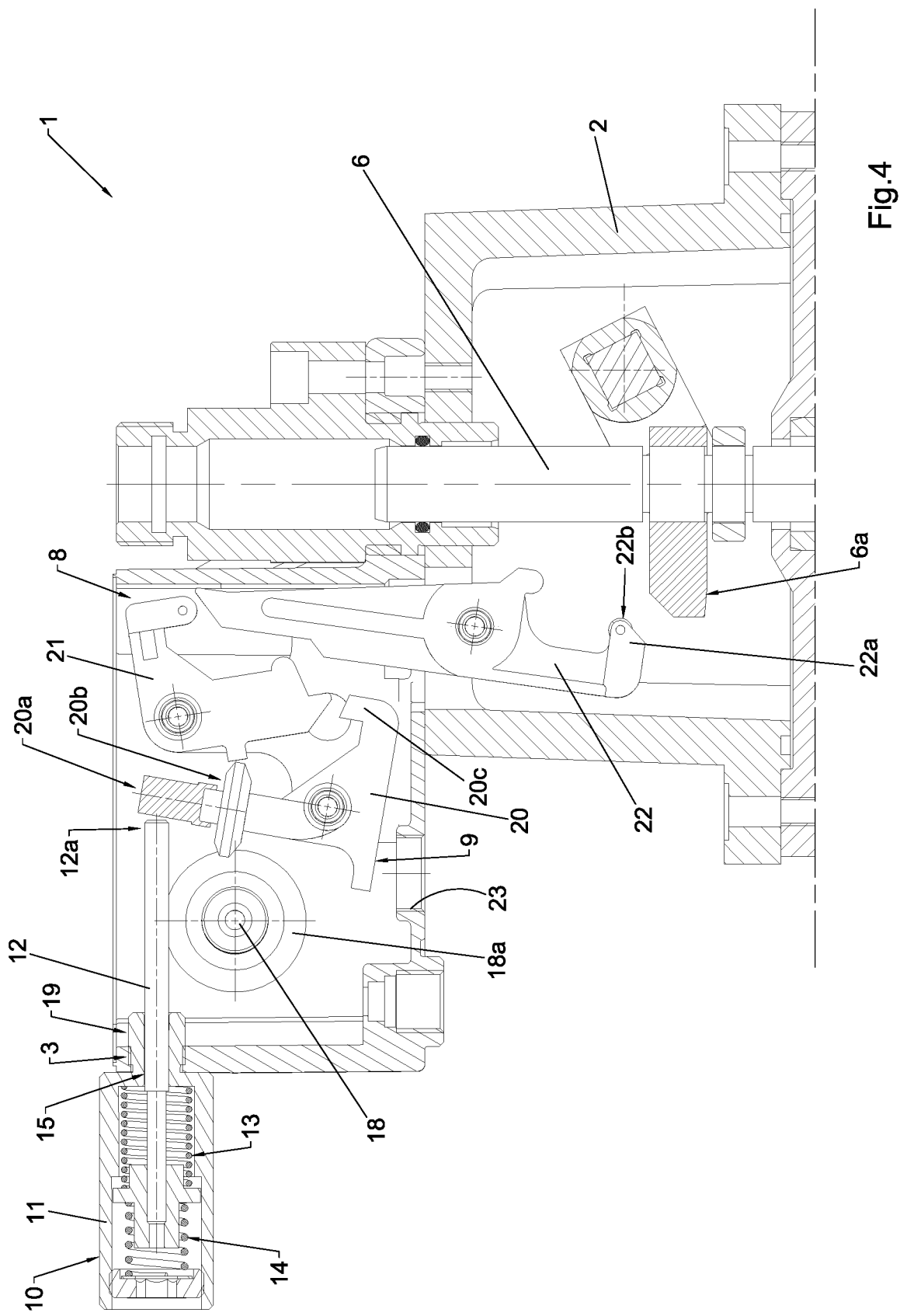
FIG. 4 shows an enlarged detail of FIG. 3.

As regards the retaining mechanism 8, it preferably comprises a retaining lever 22 removably associated with the valve body 2 and equipped at one end with a tooth 22*a*, shown in detail in FIGS. 2 and 4.

The shutter 5 is integral with a drive shaft 6 which, in turn, is equipped with a counteracting surface 6*a* on which the aforementioned tooth 22*a* of the retaining lever 22 engages so as to retain the shutter 5 in its open position.

Preferably, the release means of the retaining mechanism 8 comprise elastic means, not represented in the figures but known per se, for example a spring, which even more preferably are configured to force the retaining lever 22 in the direction corresponding to the disengagement of the counteracting surface 6*a* by the tooth 22*a*.

To facilitate the aforementioned disengagement, the tooth 22*a* is in contact with the counteracting surface 6*a* by means of a roller 22*b*.

The connection between the retaining lever 22 and the control lever 20 preferably takes place by means of an intermediate lever 21, a first end of which is constrained to the end 20*c* of the control lever 20 and the opposite end constrains the retaining lever 22 in the position retaining the shutter 5 in its open position.

Preferably, also the aforementioned intermediate lever 21 is associated with elastic means, not shown but known per se, such as a spring, which force the intermediate lever 21 so as to release the retaining lever 22.

Preferably, the safety valve 1 is equipped with a reset device to bring the shutter 5 back to the open position after an intervention of the safety valve 1, suited to allow the restoration of the valve's normal operating conditions when the anomaly that caused the intervention has been eliminated.

Preferably, the reset device comprises a reset lever 17 that can be operated manually by an operator.

Still preferably, the retaining lever 22 comprises a shaped surface configured to be engaged by the shutter 5 during the movement of the latter towards the open position so as to push the retaining lever 22 into the retaining position.

Similarly, the intermediate lever 21 preferably comprises a contoured surface configured to be engaged by the retaining lever 22 during the movement of the latter caused by the above movement of the shutter 5 so as to push the intermediate lever 21 into the retaining position.

Preferably but not necessarily, there may also be elastic means, not represented in the figures but known per se, which force the control element 9 into the locking position.

Advantageously, the abovementioned elastic means associated with the control element 9, together with the aforementioned shaped surfaces of the retaining lever 22 and the intermediate lever 21, allow the reset of the retaining mechanism 8 when the shutter 5 is brought back to the open position.

Operationally, the construction of the safety valve 1 of the invention starts from a pressure-sensitive safety valve of the known type described above.

The valve body 2 of the aforementioned valve of the known type is equipped with the through hole 3 facing the control element 9, to which the first actuator device 10 described above is connected so that the respective actuator body 12 is able to actuate the control element 9 itself.

The aforementioned connection can be implemented both in the factory or directly in the field, by applying the first actuator device 10 to a safety valve already installed on a distribution network.

Under normal temperature conditions, the shape memory spring 14 exerts no force on the actuator body 12, which is therefore kept in the rest position by the action of the retaining spring 13, as seen in FIG. 2.

When, following a variation in ambient temperature, the temperature of the shape memory spring 14 falls in the predetermined temperature range, it recovers its elastic characteristics and overcomes the action of the retaining spring 13, pushing the actuator body 12 toward the outside of the casing 11 of the first actuator device 10.

The end 12*a* of the actuator body 12 pushes the control lever 20 allowing the release of the retaining mechanism 8 and causing the consequent movement of the shutter 5 into its closed position, as shown in FIGS. 2 and 4.

Once the normal temperature conditions are restored, the shape memory spring 14 loses its elastic properties and is once again compressed by the retaining spring 13, causing the displacement of the actuator body 12 into the rest position.

At this point, the operator can act on the reset lever 17 to bring the shutter 5 back into its open position and reset the retaining mechanism 8, which is kept in the retaining position by the control element 9 that, in the meantime, has been brought back to its locking position by the respective elastic means.

The safety valve 1 may also be optionally equipped with the second actuator device sensitive to pressure, which actuates the control lever 20 in a similar way to the first actuator device 10 when the gas pressure is sufficiently different from the setting value.

Figure 5:
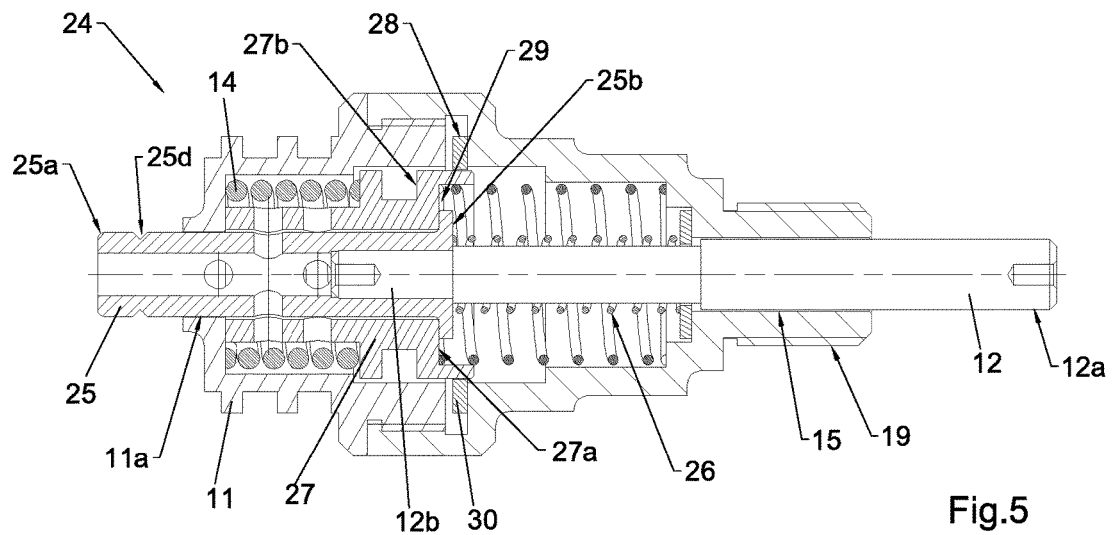
FIGS. 5 to 7 show a detail of a different embodiment of the invention, in different operating configurations.
Figure 6:
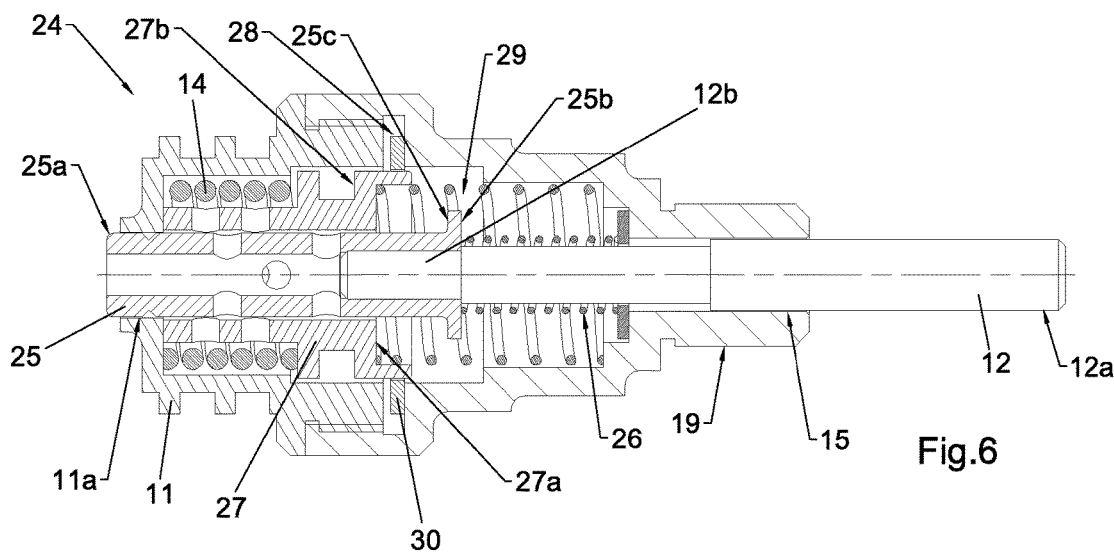
Figure 7:
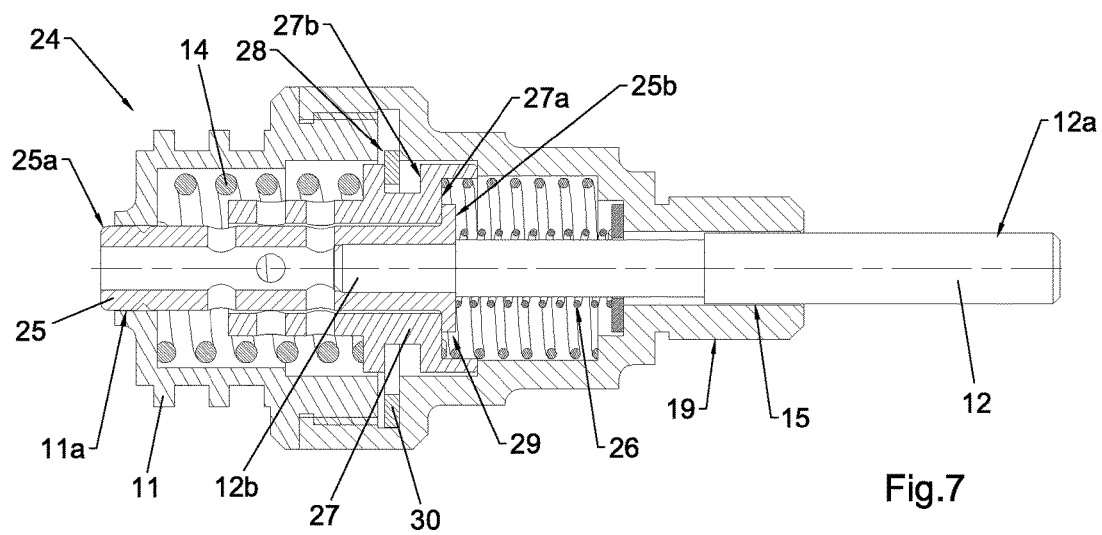

FIGS. 5 to 7 show a different embodiment of the first actuator device, indicated as a whole with number 24. For simplicity, in the above figures the components corresponding to those of the embodiments previously described are indicated by the same reference numbers.

The first actuator device 24 differs from that previously described in that it includes a locking button 25 that can be activated by an operator to cause the displacement of the actuator body 12 into the working position so as to actuate the valve.

The aforementioned locking button 25 is slidably inserted into a through hole 11*a* of the casing 11 according to a sliding direction, preferably but not necessarily, parallel to the direction in which the actuator body 12 moves.

In particular, the locking button 25 is equipped with a first end 25*a* outside the casing 11 and accessible to an operator. The second end 25*b* of the locking button 25 is associated with the actuator body 12 so that a pressure of the locking button 25 and its subsequent displacement towards the actuator body 12 causes a corresponding displacement of the actuator body 12 itself into the working position, as shown in FIG. 6.

Advantageously, the embodiment just described enables the integration of the automatic and manual operation of the actuator body 12 in a single actuator device 24.

Preferably, the thrust of the actuator body 12 by the locking button 25 occurs by means of an engagement of the second end 25*b* of the button with the second end 12*b* of the actuator body 12 which is located opposite to the other end 12*a* cooperating with the control element 9.

Still preferably, there is an elastic element 26, for example a helical spring, which pushes the locking button 25 in the opposite direction with respect to the direction of the aforementioned displacement and which allows it to return to its initial position, so as to allow the resetting of the safety valve 1.

Preferably, there are also stop elements 29 that define a rest position for the locking button 25, so as to prevent it from coming out of the casing 11 during the aforementioned return of the locking button 25.

Preferably, the aforementioned stop elements 29 comprise an abutment surface 25c of the locking button 25 and an abutment surface 27a associated with the casing 11 against which the abutment surface 25c of the button is positioned. Preferably, the aforementioned abutment surface 25c belongs to a widened portion of the locking button 25.

Still preferably, there is a movable element 27 slidably associated with the casing 11 in the direction of movement of the actuator body 12, suited to transmit the thrust of the shape memory spring 14 to the actuator body 12 so as to force it into the working position, against the thrusting action of the retaining spring 13, which preferably also acts on the movable element 27.

Preferably, the movable element 27 is slidable with respect to the locking button 25, so that pressing the locking button 25 does not cause any movement of the movable element 27, as seen in FIG. 6. As will be explained below, this configuration allows the use of a retaining device which, after the action of the shape memory spring 14, prevents the resetting of the safety valve 1, without affecting the operation of the locking button 25.

Preferably, the movable element 27 comprises the aforementioned abutment surface 27a which, besides acting as a stop surface for the return of the locking button 25 as previously described, is also suited to push the locking button 25 against the actuator body 12 under the action of the shape memory spring 14.

Advantageously, the configuration just described enables the use of the locking button 25 also as an indicator of the status of the safety valve 1. In fact, the locking button 25 protrudes from the casing 11 in a different way depending on whether the shape memory spring 14 is or is not in the forcing position. In the case shown in the figures, when the shape memory spring 14 is in its thrusting position, the locking button 25 is almost completely inside the casing 11, as seen in FIG. 6, while when the shape memory spring 14 is in its rest position the locking button 25 protrudes to a greater extent, as seen in FIG. 5.

Preferably, the surface of the locking button 25 has marks suited to allow the operator identify the state of the safety valve 1. For example, the locking button 25 has an incision 25d in a position such as to be visible only when the button is in the rest position.

Preferably, there is also a retaining device 28 which prevents the return of the movable element 27 after the latter has pushed the actuator body 12 into the working position, even if in the meantime the shape memory spring 14 has returned to its rest position and, therefore, does not exert any further thrusting action.

The aforementioned retaining device 28 prevents the safety valve 1 from being reset after the shape memory spring 14 is in operation. This, advantageously, reduces the safety risks, since the temperature conditions that caused the operation of the shape memory spring 14 may have resulted in damage to the safety valve such as to jeopardize its proper functioning. In this case, the impediment to the resetting of the valve requires it to be replaced, which results in a safety advantage. Furthermore, the retaining device 28 also retains the locking button 25, allowing the operator to realize that the aforementioned temperature conditions were reached.

Preferably, the retaining device 28 comprises a retaining element 30 which allows the movement of the movable element 27 in the direction of the thrust generated by the actuator body 12 in its working position and which, once the movable element 27 has moved the actuator body 12 into the working position, spontaneously assumes a stop position in which it prevents the movable element 27 from going back to the initial position, as shown in FIG. 7.

Preferably, this is obtained by equipping the movable element 27 with a stop surface 27b on which the retaining element 30 is positioned so as to lock the movable element as described above.

Still preferably, the aforementioned stop surface 27b belongs to a groove formed on the surface of the movable element 27 and suited to house the retaining element 30.

Preferably, the displacement of the retaining element 30 in the stop position is obtained by effect of the weight of the latter.

Embodiments not shown in the figures may include elastic, magnetic or other means to force the retaining element 30 into its stop position.

Given the above, it is understood that the safety valve described achieves all the preset purposes.

In particular, the connection of an actuator device sensitive to temperature to a pressure-sensitive safety valve of a known type as described above allows the valve functions to be extended in a simple and economic manner without the need to implement further modifications to the valve itself.

The invention claimed is:

1. A gas safety valve comprising:
a valve body which defines an inlet, an outlet and a flow pipe connecting said inlet to said outlet;
a shutter located in said flow pipe and movable between an open position, in which said shutter allows the flow of an operating gas through said flow pipe, to a closed position, in which said shutter prevents said flow;
first thrust means configured to push said shutter into said closed position;
a retaining mechanism movably mounted in said valve body, said retaining mechanism being movable between a first position suited to maintain said shutter in said open position and a second position where said shutter is released so that said shutter can move to said closed position;
a control element movably mounted in said valve body, said control element being movable between a locking position that holds said retaining mechanism in said first position and a released position, said retaining mechanism being urged to the second position when said control element is in said released position;
a first actuator device suited to force said control element into said released position,
said first actuator device comprising:
an actuator body equipped with a first end, said actuator body being movable between a rest position in which it allows said control element to maintain said locking position and a working position in which said first end forces said control element into said released position;
a retaining spring configured to force said actuator body into said rest position;
a shape memory spring configured to overcome the force of said retaining spring on said actuator body so as to force said actuator body into said working position when the temperature of said shape memory spring is within a predetermined temperature range;
said valve body comprising a through hole facing said control element, said first actuator device comprising a casing that houses said retaining spring and said shape memory spring and equipped with a hole in which said actuator body is slidably mounted so that said first end protrudes outside said casing, said casing being removably connected to said valve body so that said first end is arranged through said through hole, said first actuator device comprising a locking button slidably inserted in a through hole of said casing, configured to be able to act on said actuator body and equipped with a first end positioned outside of said casing and a second end associated with said actuator body in such a way that a movement of said locking button toward said actuator body causes a corresponding displacement of said actuator body into said working position.

2. The safety valve according to claim 1, wherein said casing is removably connected to said valve body by screw means belonging to said valve body and said casing.

3. The safety valve according to claim 1, wherein said control element comprises a control lever one end of which constrains said retaining mechanism in the first position, said first end of said actuator body facing said control lever so that the movement of said actuator body in said working position moves said control lever to disengage said retaining mechanism.

4. The safety valve according to claim 1, wherein said shutter is integral with a drive shaft, said retaining mechanism comprising a retaining lever equipped with a tooth at one end suited to engage a corresponding counteracting surface belonging to said drive shaft.

5. The safety valve according to claim 4, wherein said tooth is disengaged from said counteracting surface when said retaining mechanism is moved to the second position.

6. The safety valve according to claim 1, wherein said control element is forced into said locking position when said shutter is moved from said closed position to said open position.

7. The safety valve according to claim 1, further comprising an elastic element to push said locking button in a direction opposite to the direction of said movement, there being present stop elements to limit the return stroke of said locking button in said opposite direction.

8. The safety valve according to claim 1, further comprising a movable element slidably associated with said casing according to the direction of movement of said actuator body so as to transmit the force of said shape memory spring to said actuator body so as to force it into said working position.

9. The safety valve according to claim 8, wherein said movable element comprises an abutment surface suited to be set up against a corresponding abutment surface belonging to said locking button in order to thrust said locking button against said actuator body under the action of said shape memory spring.

10. The safety valve according to claim 8, further comprising a retaining device suited to prevent the return of said movable element after said movable element has forced said actuator body into said working position.

11. A method for constructing a safety valve for gas, comprising the following operations:
providing the safety valve comprising:
a valve body which defines an inlet, an outlet and a flow pipe connecting said inlet to said outlet;
a shutter located in said flow pipe and movable between an open position, in which said shutter allows the flow of an operating gas through said flow pipe, and a closed position, in which said shutter prevents said flow;
first thrust means configured to push said shutter into said closed position;
a retaining mechanism mounted in said valve body, said retaining mechanism being movable between a first position suited to maintain said shutter in said open position and a second position where said shutter is released so that said shutter can move to said closed position;
a control element movably mounted in said valve body, said control element being movable between a locking position that holds said retaining mechanism in said first position and a released position, said retaining mechanism being urged to the second position when said control element is in said released position;
a first actuator device suited to force said control element into said released position;
preparing said first actuator device so that it includes:
a casing equipped with a hole;
an actuator body slidably mounted in said hole and comprising a first end;
a retaining spring housed in said casing, configured to force said actuator body into a rest position;
a shape memory spring housed in said casing, configured to overcome the force of said retaining spring on said actuator body so as to push said first end towards the outside of said casing in a working position when the temperature of said shape memory spring is within a predetermined temperature range;
a locking button slidably inserted in a through hole of said casing, configured to be able to act on said actuator body and equipped with a first end positioned outside of said casing and a second end associated with said actuator body in such a way that a movement of said locking button toward said actuator body causes a corresponding displacement of said actuator body into said working position;
in said valve body creating a through hole facing said control element;
connecting said casing to said valve body so that said first end of said actuator body is positioned through said through hole to force said control element into said released position when said actuator body is in said working position and to release said control element when said actuator body is positioned in said rest position.

* * * * *